United States Patent
Long et al.

(10) Patent No.: US 7,647,586 B2
(45) Date of Patent: *Jan. 12, 2010

(54) SYSTEM AND METHOD FOR PROVIDING EXCEPTIONAL FLOW CONTROL IN PROTECTED CODE THROUGH WATCHPOINTS

(75) Inventors: Dean R. E. Long, Boulder Creek, CA (US); Christopher J. Plummer, San Martin, CA (US); Nedim Fresko, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 547 days.

This patent is subject to a terminal disclaimer.

(21) Appl. No.: 10/918,131

(22) Filed: Aug. 13, 2004

(65) Prior Publication Data

US 2006/0037004 A1    Feb. 16, 2006

(51) Int. Cl.
*G06F 9/44* (2006.01)
*G06F 9/45* (2006.01)

(52) U.S. Cl. .................. 717/129; 717/158; 717/161

(58) Field of Classification Search .......... 717/120–161
See application file for complete search history.

(56) References Cited

U.S. PATENT DOCUMENTS

| | | | | |
|---|---|---|---|---|
| 6,158,045 | A * | 12/2000 | You .......................... | 717/124 |
| 6,567,974 | B1 * | 5/2003 | Czajkowski ................ | 717/151 |
| 6,654,773 | B2 * | 11/2003 | Hills ......................... | 707/206 |
| 6,681,384 | B1 * | 1/2004 | Bates et al. ................. | 717/129 |
| 6,839,894 | B1 * | 1/2005 | Joshi et al. .................. | 717/130 |
| 7,093,249 | B2 * | 8/2006 | Melamed et al. ........... | 718/100 |
| 7,178,135 | B2 * | 2/2007 | Bates et al. ................. | 717/129 |
| 7,426,721 | B1 * | 9/2008 | Saulpaugh et al. ......... | 717/144 |
| 2002/0120640 | A1 * | 8/2002 | Hills ......................... | 707/206 |
| 2003/0167459 | A1 * | 9/2003 | Bates et al. ................. | 717/125 |
| 2004/0210876 | A1 * | 10/2004 | Stall et al. .................. | 717/127 |
| 2005/0010912 | A1 * | 1/2005 | Adolphson et al. ......... | 717/151 |
| 2005/0034024 | A1 * | 2/2005 | Alverson et al. ............. | 714/38 |

OTHER PUBLICATIONS

Do generational schemes improve the garbage collection efficiency? Srisa-an, W.; Chang, J.M.; Chia-Tien Dan Lo, 2000, pp. 58-63, IEEE.*
A performance comparison between stop-the-world and multithreaded concurrent generational garbage collection for Java Lo, C.-T.D.; Srisa-an, W.; Chang, J.M., 2002, pp. 301-308, IEEE.*

(Continued)

*Primary Examiner*—Wei Y Zhen
*Assistant Examiner*—Satish Rampuria
(74) *Attorney, Agent, or Firm*—Park, Vaughan & Fleming LLP (57) ABSTRACT

A system and method for providing exceptional flow control in protected code through watchpoints is described. Code is generated. The generated code includes a sequence of normal operations and is subject to protection against copying during execution of the generated code. Execution points within the generated code are identified. A watchpoint corresponding to each of the execution points is set. An exception handler associated with each watchpoint is defined and includes operations exceptional to the normal operations sequence that are performed upon a triggering of each watchpoint during execution of the generated code.

9 Claims, 9 Drawing Sheets

OTHER PUBLICATIONS

Distributed garbage collection by timeouts and backward inquiry Sung-Wook Ryu; Eul Gyu Im; Neuman, B.C., 2003, pp. 426-432, IEEE.*

Solaris (operating system); http://en.wikipedia.org/wiki/Solaris_(operating_system); accessed on Feb. 22, 2008; pp. 1-7.*

Solaris™ Internals: Solaris 10 and OpenSolaris Kernel Architecture, Second Edition by Richard McDougall; Jim Mauro; http://proquest.safaribooksonline.com/0131482092; accessed on Feb. 22, 2008; pp. 1-13.*

Weimer et al., Finding and Preventing Run-Time Error Handling Mistakes, ACM Sigplan, 2004, pp. 419-431.*

Jorgensen, Improving the precision and correctness of exception analysis in Soot, www.sable.mcgill.ca, pp. 1-67.*

Publication: "*GDB provides some additional commands for controlling the type checker*", Chapter 9, Using GDB with Different Languages, pp. 89 to 178. http://www.cse.unsw.edu.au/help/doc/info/gdb/Languages.html.

Publication: "*How debuggers work*" by Rosenberg et al, Algorithms, Data Structures, and Architecture, New York, John Wiley & Sons, US, 1996, pp. 107-133, XP002351059, ISBN: 0-471-14966-7.

Publication: "*Debugging with GDB*", the GNU source-level debugger, online Jan. 1994, XP002351603, retrieved from the internet: http://docs.freebsd.org/info/gdb/gdb.pdf.

Publication: "*Appendix D Installing GDB*", http://www.cse.unsw.edu.au/help/doc/info/gdb/Installing_GDB.html.

* cited by examiner

SYSTEM AND METHOD FOR PROVIDING EXCEPTIONAL FLOW CONTROL IN PROTECTED CODE THROUGH WATCHPOINTS

FIELD OF THE INVENTION

The invention relates in general to exceptional flow control and, in particular, to a system and method for providing exceptional flow control in protected code through watchpoints.

BACKGROUND OF THE INVENTION

Fundamentally, a computer program is a sequence of instructions expressed according to the rules and syntax of a high level programming or assembly language, such as C++ or JAVA™ from Sun Microsystems, Santa Clara, Calif., USA (hereinafter "Java"). The program specifies the control flow and logic to be performed at runtime. Prior to execution, the instructions are translated into machine operations by an interpreter or compiler. An interpreter performs a runtime translation of the instructions, which sacrifices speed for convenience and is generally inefficient. However, interpreted code is acceptable for non-critical applications and can be modified on-the-fly without having an appreciable effect on execution speed.

Conversely, compilers generate executable code embodied as an executable module. Compiled or generated code typically executes efficiently, but, once compiled, cannot be changed except through patching, which statically modifies or replaces the generated code. Patching is often performed for code updates to fix program bugs or to provide improve functionality. Patching can also be performed as temporary memory writes to facilitate secondary system activities, such as exceptional flow control, which uses short-lived modifications to the generated code that are removed upon completion of the system activity. Temporary memory writes include setting breakpoints, setting safepoints for rendezvous of threads, selective instrumentation or profiling, and performing garbage collection activities, such as object header marking for liveness checking. Rendezvous points or safe points are set to enable a task that requires all threads to be in a known state to safely execute.

For example, patching generated code is particularly effective at improving the efficiency of garbage collection in memory-constrained embedded systems, where memory fragmentation can be damaging to performance. In garbage collection, precise pointer scanning can be used to allow a virtual machine environment to fully compact a memory heap by tracking memory pointers assigned to dynamically allocated objects. For efficiency, the generated code is kept garbage collection unsafe at runtime. Garbage collection safepoints are defined at particular execution points within the code and memory pointer manipulation is allowed to proceed at runtime without fear of interacting with garbage collection operations. Safepoints avoid the overhead incurred by having to track memory pointers by stopping all execution threads during a rendezvous to allow garbage collection to proceed. Typically, safepoints are defined at method invocations, object allocations, thread synchronization calls, loop iterations, and similar execution points to ensure that all threads can be reached and stopped.

Safepoints are triggered in response to a garbage collection request, which can be detected through polling. However, polling is computationally expensive. For instance, on RISC architectures, polling often requires up to five processor cycles per poll, which creates unacceptably high overhead, particularly where safepoints are set at each loop iteration. Alternatively, code patching allows garbage collection request monitoring to proceed with no overhead cost. In the absence of a garbage collection request, a table of the locations of the safepoints is maintained for use by a dynamic complier, which patches the generated code at each safepoint at runtime upon receiving a garbage collection request. The patches invoke exception flow control that stops thread execution through, for instance, a function call, code branch, software trap, or instruction that causes a memory fault trap. Generally, a patch causing exceptional flow control modifies only a small section of code to cause execution to be redirected to an exception handler. The exception handler then performs extra operations and removes the patch to enable regular execution to resume once control is returned back from the exception handler.

Patching code, such as used for garbage collection safepoints, can be incompatible with generated non-modifiable code, such as read only code or code embodied in read only memory. Patching code can also be ill-suited to code maintained in a copy protected form that does not readily accommodate patching, such as code found in precompiled and linked methods or speculatively initialized application models. Similarly, process cloning as provided through copy-on-write or deferred copying allows a child process to implicitly share the process memory space, including generated code, of a master parent process, provided that the shared memory space of the child process remains unmodified. Code patching destroys the implicit sharing relationship and can negate memory advantages gained through process cloning.

Therefore, there is a need for an approach to providing temporary writes to generated code without destroying copy protection to enable exceptional flow control. Preferably, such an approach would be performed in a non-destructive manner using operating system-provided watchpoints.

SUMMARY OF THE INVENTION

One embodiment provides a system and method for providing exceptional flow control in protected code through watchpoints. Code is generated. The generated code includes a sequence of normal operations and is subject to protection against copying during execution of the generated code. Execution points within the generated code are identified. A watchpoint corresponding to each of the execution points is set. An exception handler associated with each watchpoint is defined and includes operations exceptional to the normal operations sequence that are performed upon a triggering of each watchpoint during execution of the generated code.

Still other embodiments of the invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the invention. Accordingly, the drawings and detailed description are to be regarded as illustrative in nature and not as restrictive.

DETAILED DESCRIPTION

System Overview

Figure 1:
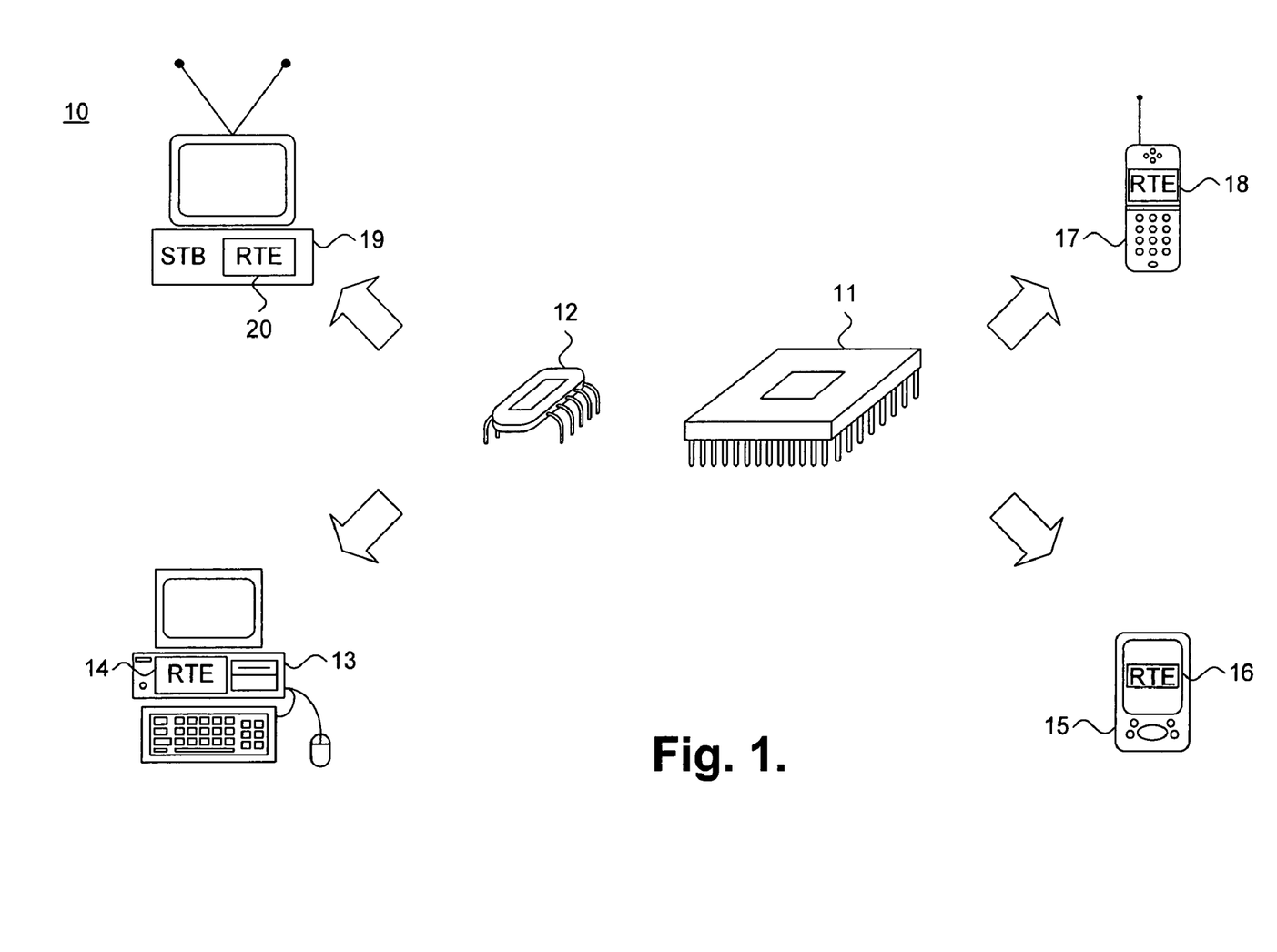
FIG. 1 is a functional block diagram showing, by way of example, runtime environments conventionally implemented on a plurality of programmable devices.

FIG. 1 is a functional block diagram 10 showing, by way of example, runtime environments conventionally implemented on a plurality of programmable devices. The programmable devices include, nonexclusively, computer systems, such as desktop 15 or laptop computer systems, portable computing devices, such as personal data assistants 15, and consumer devices, such as cellular telephones 17 and set top boxes (STB) 19. Other types of programmable devices are possible. Each programmable device includes a microprocessor 11 operating under the control of an operating system and application program instructions embodied in a memory device 12. In addition, each programmable device preferably includes non-volatile storage, such as a hard drive or read-only memory (ROM), for persistently maintaining the operating system and application programs, and volatile storage, in the form of random access memory (RAM), for transiently storing code and statically- and dynamically-allocated data objects, as further described below with reference to FIG. 2. Finally, each programmable device also provides a managed code platform, such as the Java operating environment, executing in a runtime environment (RTE) 14, 16, 18, 20, as further described below with reference to FIG. 3, which enables the programmable device to execute specific types of application programs, generally written in a machine-portable programming language, such as the Java programming language.

In a further embodiment, each operating system supports a process cloning mechanism that spawns multiple and independent isolated user applications by cloning the memory space of specifiable processes, as further described below with reference to FIGS. 4 through 5B. An example of a process cloning mechanism suitable for use in the present invention is the fork( ) system call provided by the Unix or Linux operating systems, such as described in M. J. Bach, "The Design Of The Unix Operating System," Ch. 7, Bell Tele. Labs., Inc. (1986), the disclosure of which is incorporated by reference. The process invoking the fork( ) system call is known as the "parent" or master process and the newly created process is called the "child" process. The operating system assigns a new process identifier to the child process, which executes as a separate process. The operating system also creates a logical copy of the context of the parent process by copying the memory space of the parent process into the memory space of the child process. In a copy-on-write variant of the fork( ) system call, the operating system only copies references to the memory space and defers actually copying individual memory space segments until, and if, the child process attempts to modify the referenced data of the parent process context. The copy-on-write fork( ) system call is faster than the non-copy-on-write fork( ) system call and implicitly shares any data not written into between the parent and child processes.

Executable Process Address Space

Figure 2:
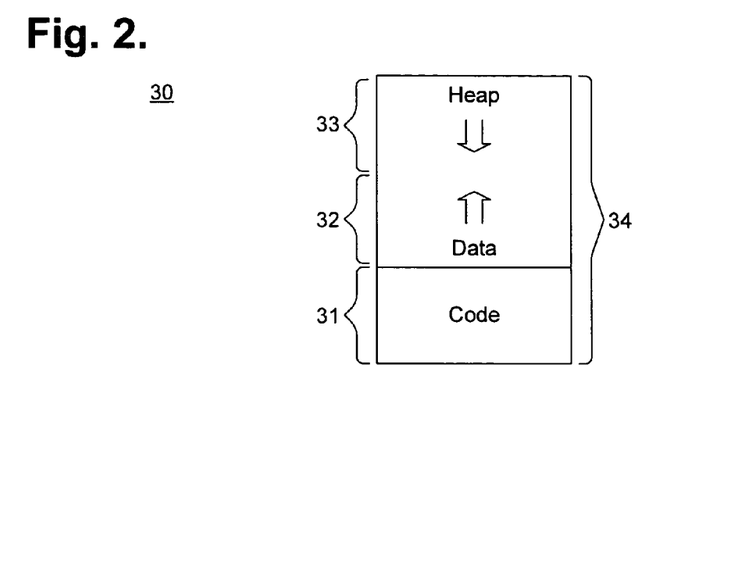
FIG. 2 is a block diagram showing, by way of example, address space for a executable process as provided by a programmable device.

FIG. 2 is a block diagram 30 showing, by way of example, address space for a executable process 66 as provided by a programmable device. The executable process 66 is generated by a compiler or similar pre-execution tool and includes a code segment 31, data segment 32 and heap segment 33. The heap segment 33 could also implement a stack. The code segment 31 contains the program instructions as object code for execution by the microprocessor 11. The code segment 31 has a fixed size. The data segment 32 and heap segment 33 respectively contain statically- and dynamically-allocated objects. Both the data segment 32 and heap segment 33 have variable sizes and grow in opposite directions in terms of memory usage.

As shown, the code segment 31, data segment 32 and heap segment 33 are loaded as generated code into a memory in a single linear address space beginning with the code segment 32 at the lowest memory address. However, in a machine architecture supporting virtual memory paging, the entire address space of the executable process 66 could be paged to memory, thereby resulting in non-contiguous placement of the segments or, where a segment spans multiple pages, parts of segments. Moreover, in memory-constrained programmable devices, the code segment 31 and data segment 32 can be designated as read only or be embodied on a ROM device to avoid having to be read from non-volatile storage into memory prior to execution. Consequently, only objects defined within the heap segment 32 are actively allocated and deallocated at runtime.

Portions of the generated code in the executable process 66, including individual segments, parts of segments, or the entire process, can be subject to protection against copying during execution. Copy protection includes designation as read only or embodiment on a ROM device. Copy protection also includes precompiled and linked methods or speculatively initialized application models, such as respectively described in commonly-assigned U.S. patent application, entitled "System and Method for Providing Precompiled Code through Memory Space Cloning of a Master Runtime System Process," Ser. No. 10/745,020, filed Dec. 22, 2003, pending, and U.S. patent application, entitled "System and Method for Performing Speculative Initialization of Application Models for a Cloned Runtime System Process," Ser. No. 10/745,022, filed Dec. 22, 2003, pending, the disclosures of which are incorporated by reference, or process cloning as provided through copy-on-write or deferred copying, such as described in commonly-assigned U.S. patent application, entitled "System and Method for Dynamic Preloading of Classes through Memory Space Cloning of a Master Runtime System Process," Ser. No. 10/745,023, filed Dec. 22, 2003, pending; U.S. patent application, entitled "System and Method for Performing Incremental Initialization of a Master Runtime System Process," Ser. No. 10/745,164, filed Dec. 22, 2003, pending; and U.S. patent application, entitled "System and Method for Eliminating Static Initialization Overhead by Memory Space Cloning of a Master Runtime System Process," Ser. No. 10/745,021, filed Dec. 22, 2003, pending; the disclosures of which are incorporated by reference. Other types of copy protection over generated code are possible.

Prior Art System for Providing Exceptional Flow Control

Figure 3:
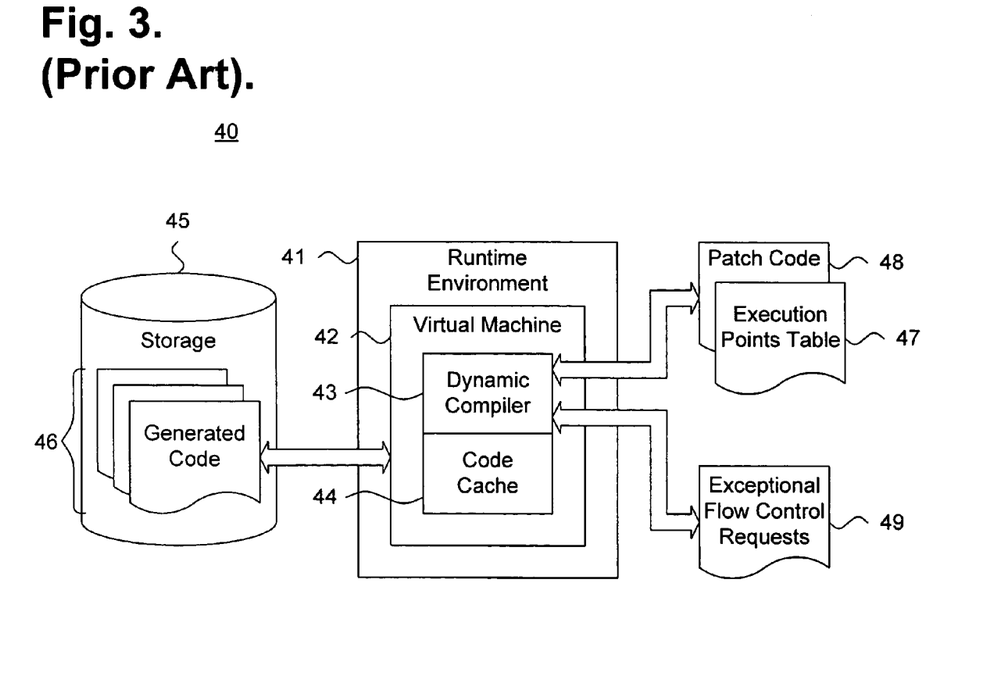
FIG. 3 is a block diagram showing a prior art system for providing exceptional flow control in protected code.

FIG. 3 is a block diagram showing a prior art system 40 for providing exceptional flow control in protected code. By way of example, the system is described with reference to the Java operating environment, although other forms of managed code platforms that execute applications preferably written in an object oriented programming language, such as the Java programming language, could also be used.

The system 40 defines an exemplary runtime environment 41 provided through an operating system and includes a virtual machine (VM) process 42 that executes generated code 46 maintained in non-volatile storage 45. Typically, the generated code 46 remains unchanged in memory and, at runtime, portions of the generated code 46 are progressively staged from memory into a code cache 44 as execution proceeds. However, to accommodate requests for exceptional flow control 49, the generated code 46 can be patched by a dynamic compiler 43 to temporarily write modifications or changes, as specified through patch code 48, into the generated code 46 in memory. The patch code 48 is typically a set of function calls to runtime system rendezvous code that stop thread execution by suspending execution or causing the thread to sleep or wait. Exceptional flow control requests 49 include setting breakpoints, setting safepoints for rendezvous of threads, selective instrumentation or profiling, and performing garbage collection activities, such as object header marking for liveness checking. Other types of exceptional flow control requests 49 are possible.

At runtime, the dynamic compiler 43 maintains a table of execution points 47 within the generated code 46 that includes the locations in memory of method invocations, object allocations, thread synchronization calls, loop iterations, and similar execution points to ensure that all threads can be reached and stopped. Other execution points are possible. Upon receiving an exceptional flow control request 49, the dynamic compiler 43 consults the execution points table 47 and patches the generated code 46 in memory with the patch code 48, which provides instructions that stop the corresponding execution thread at a rendezvous point. The thread that requested exceptional flow control waits for the watched execution threads to stop during a rendezvous. Upon completion of the rendezvous, including any secondary work that needs to be done, such as performing a garbage collection, the patch code 48 is removed from the generated code 46 and normal execution by the watched execution threads resumes.

While effective at accommodating exceptional flow control requests 49, the patching of the generated code 46 in memory is either inconsistent or incompatible with copy protected code. Generated code maintained as read only or embodied on a ROM device cannot be patched. And patching generated code for recompiled and linked methods, speculatively initialized application models, or cloned processes, as provided through copy-on-write or deferred copying, can negate significant memory advantages as provided through pre-compilation, initialization and implicit sharing.

Memory Mapping for a Parent Process

In a further embodiment, the runtime environment 41 executes an application framework that spawns multiple independent and isolated user application process instances by preferably cloning the memory space of the virtual machine process 42 as a "parent" or master process to create one or more "child" processes. The example of an application framework suitable for use in the present invention is the Unix operating system, such as described generally in M. J. Bach, supra at Ch. 2, the disclosure of which is incorporated by reference.

Figure 4:
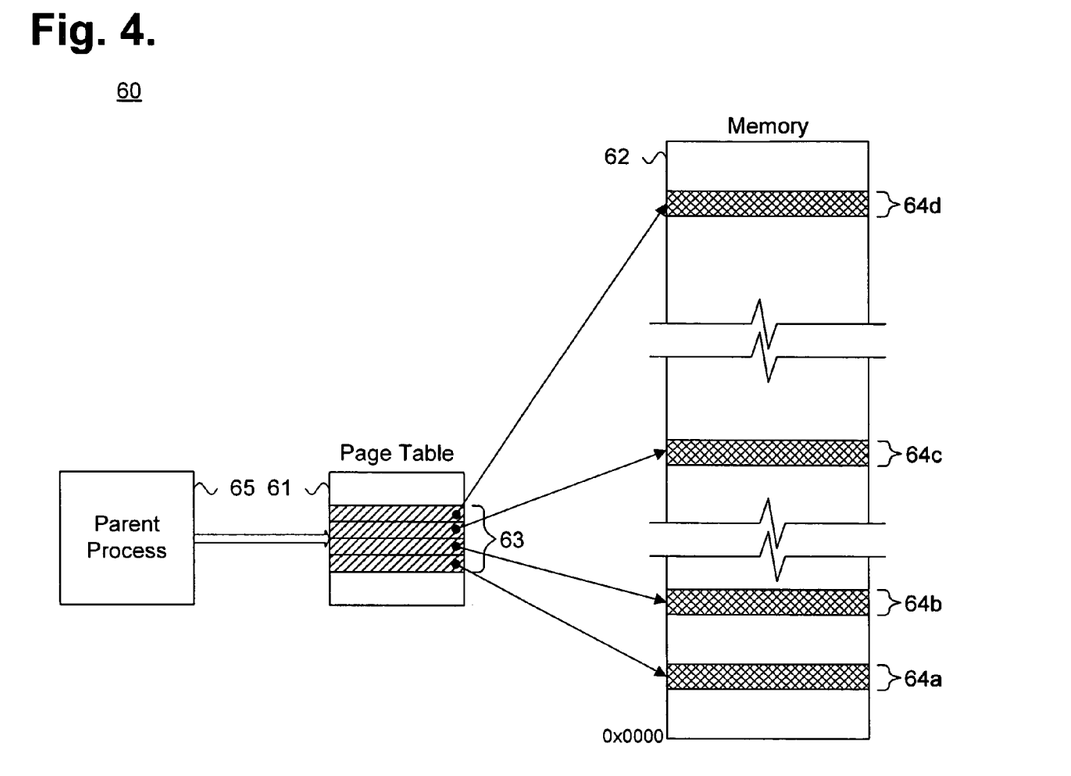
FIG. 4 is a block diagram showing, by way of example, a parent process mapped into memory.

FIG. 4 is a block diagram 60 showing, by way of example, a parent process 65 mapped into memory 62. Generally, the context for an executing process includes a data space, user stack, kernel stack, and a user area that lists open files, current directory and supervisory permission settings. Other types of context can also be provided. The context is stored and managed in the memory 62 by the operating system. At runtime, the operating system instantiates a representation of the executable parent process 65 into the memory 62, possibly in non-contiguous pages 64a-d, and records the allocation of the memory space as page table entries 63 into the page table 61 prior to commencing execution of the parent process 65. As well, the parent process context could similarly be mapped using other memory management systems, such as using demand paging, swapping and similar process memory allocation schemes compatible with process cloning, particularly process cloning with copy-on-write semantics.

Memory Mapping for a Child Process

Figure 5:
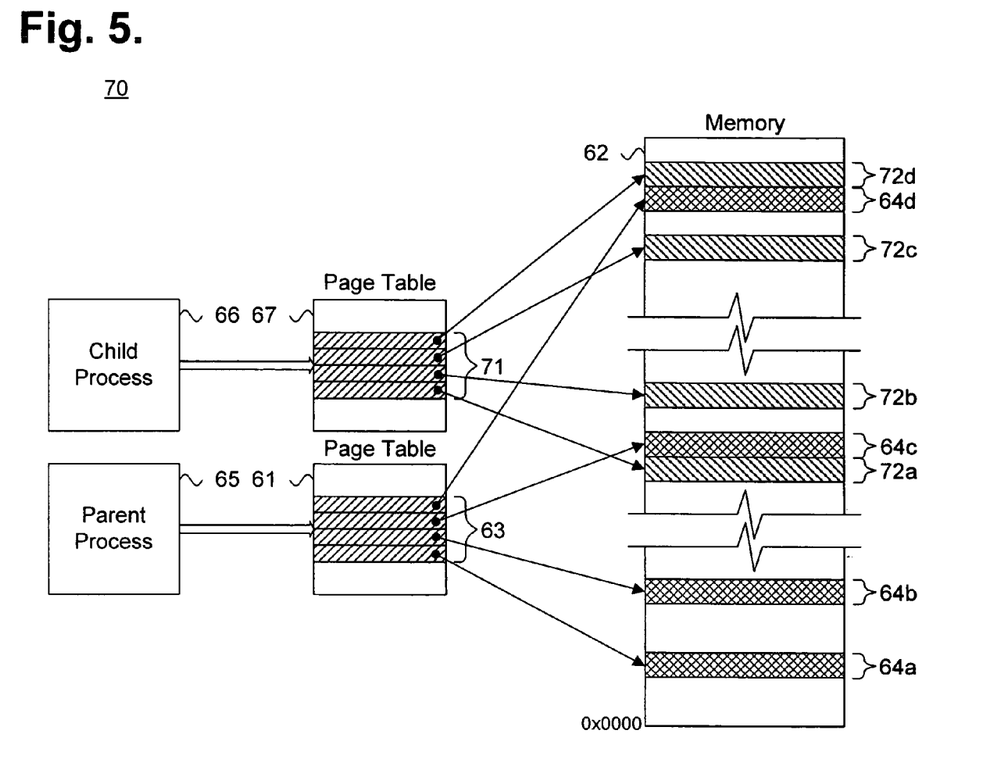
FIG. 5 is a block diagram showing, by way of example, a parent process and a child process mapped into memory through memory space cloning.

FIG. 5 is a block diagram 70 showing, by way of example, a parent process 65 and a child process 66 mapped into memory 62 through memory space cloning. In a system with process cloning that does not provide copy-on-write semantics, physical copies of the pages 64a-c in the memory 62 storing the parent process context are created for each child process. In response to a process cloning request, the operating system instantiates a copy of the representation of the executable parent process 65 for the child process 66 into the memory 62, possibly in non-contiguous pages 72a-d, and records the allocation of the memory space as page table entries 71 into a page table 67 prior to commencing execution of the child process 66. Thus, the child process 66 is created with a physical copy of the context of the parent process 65. Since a new, separate physical copy of the parent process context is created, the child process 66 inherits the prewarmed state 41, including the application-model specific class loader instances 41 and one or more application model-specific code caches 43 from the parent process 65. However, the overall memory footprint of the runtime environment 31 is increased by the memory space required to store the additional copy of the parent process context.

Memory Mapping for a Child Process with Copy-on-Write

Figure 6A:
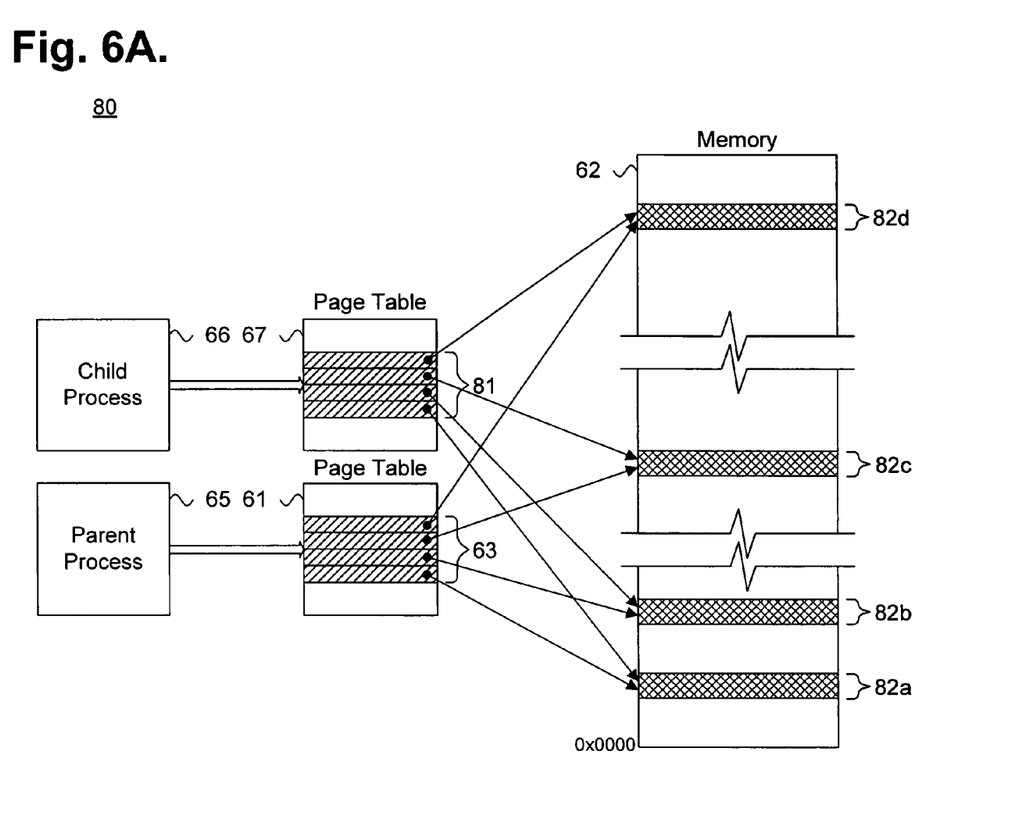
FIGS. 6A-B are block diagrams showing, by way of example, a parent process and a child process mapped into memory through memory space cloning with copy-on-write semantics.
Figure 6B:
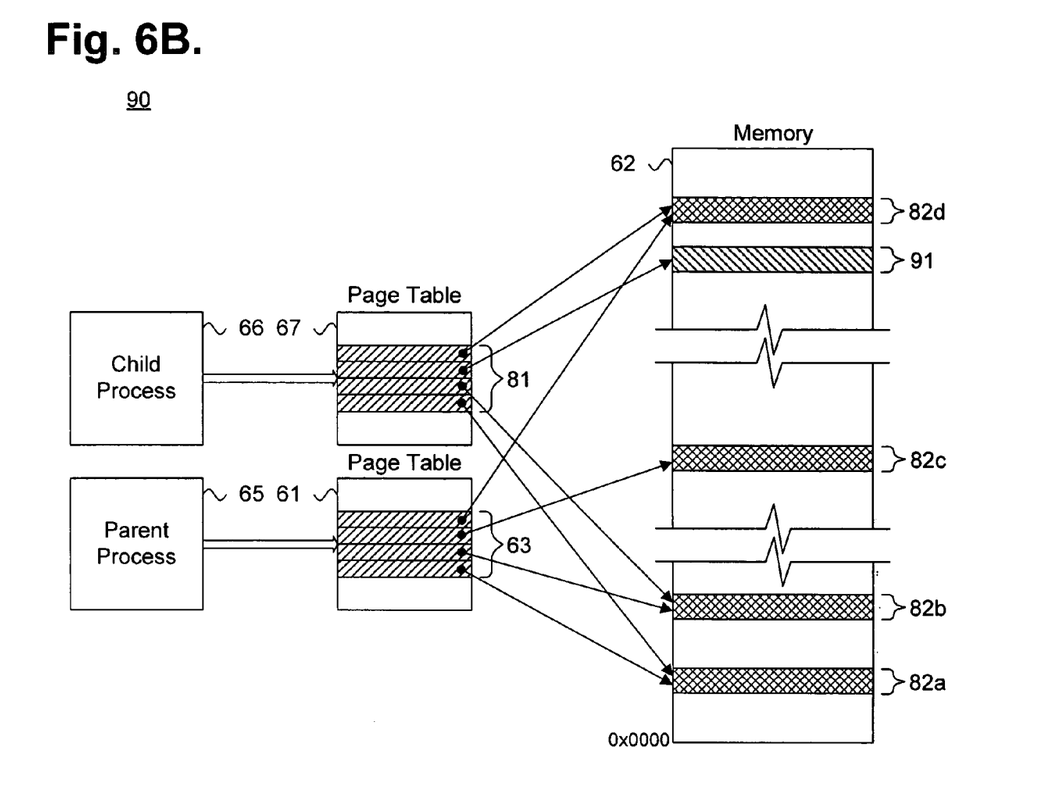

FIGS. 6A-B are block diagrams 80, 90 showing, by way of example, a parent process 65 and a child process 66 mapped into memory 62 through memory space cloning with copy-on-write semantics. In a system with process cloning that provides copy-on-write semantics, only copies of the references, typically page table entries, to the memory space storing the parent process context are created for each child process. Referring first to FIG. 6A, in response to a process cloning request, the operating system copies only the page table entries 63 referencing the memory space of the executable parent process 65 as a new set of page table entries 81 for the child process 66. Thus, the child process 66 uses the same references to the possibly non-contiguous pages 64a-d storing the parent process context as the parent process 66. Initialization and execution of the application associated with the child process 66 requires less time, as only the page table entries 62 are copied to clone the parent process context. Furthermore, until the child process 66 attempts to modify the parent process context, the memory space is treated as read only data, which can be shared by other processes.

Referring next to FIG. 6B, the child process 66 has attempted to modify one of the pages 82c in the memory space of the parent process context, such as through code patching. In response, the operating system creates a physical copy of the to-be-modified memory space page 82c as a new page 91 and updates the allocation in the page table entries 81 for the child process 66. Through copy-on-write semantics, the overall footprint of the runtime environment 31 is maintained as small as possible and only grows until, and if, each child process 66 actually requires additional memory space for application-specific context. Nevertheless, the new page 91 is needlessly created, as code patching for exceptional flow control introduces only temporary modifications or changes to the child process 66, which are removed upon completion of the exceptional flow control.

System for Providing Exceptional Flow Control Through Watchpoints

Figure 7:
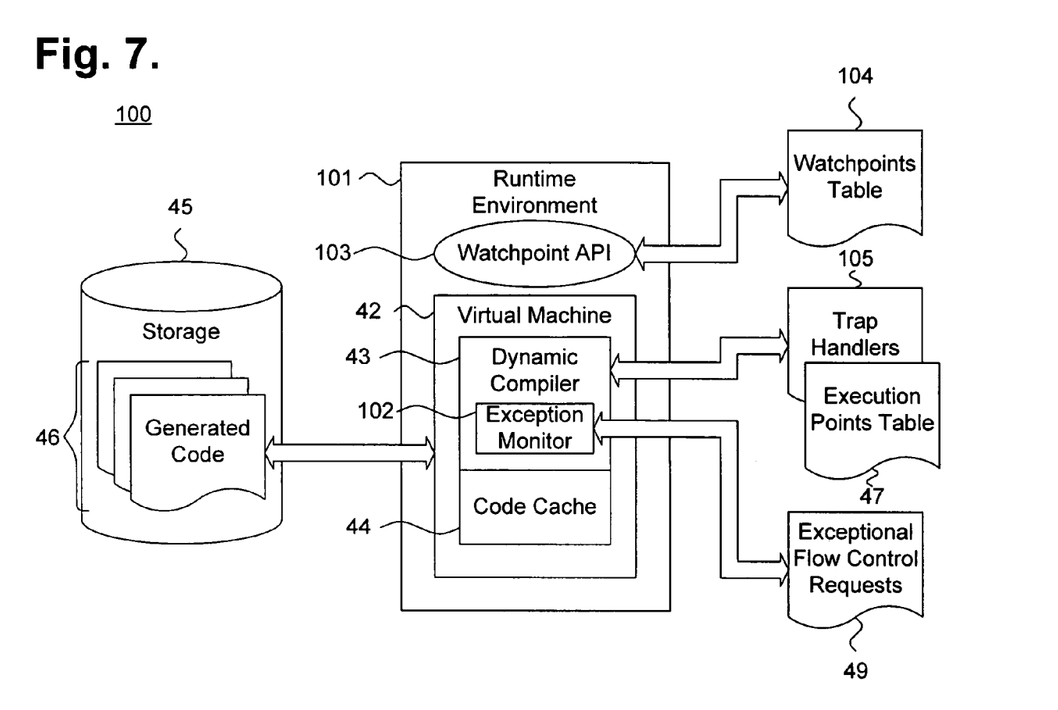
FIG. 7 is a block diagram showing a system for providing exceptional flow control in protected code through watchpoints, in accordance with one embodiment.

FIG. 7 is a block diagram showing a system 100 for providing exceptional flow control in protected code through watchpoints, in accordance with one embodiment. By way of example, the system is also described with reference to the Java operating environment, although other forms of managed code platforms could also be used.

The system 100 also defines an exemplary runtime environment 101 provided through an operating system and includes the virtual machine (VM) process 42 that executes the generated code 46 maintained in the non-volatile storage 45. As before, portions of the generated code 46 are progressively staged from memory into a code cache 44 at runtime as execution proceeds. At runtime, an exception monitor 102 running within the dynamic compiler 43 sets watchpoints, as further described below with reference to FIG. 8, at the execution points identified in the execution point table 47 to accommodate requests for exceptional flow control 49. Each watchpoint is set through a watchpoint application programming interface (API) 103 exported by the operating system in the runtime environment 101, such as provided by the Solaris operating system. The operating system maintains a table of watchpoints 104 that identifies code triggered upon execution of watched generated code. Exception handlers 105 associated with each set watchpoint define code that stop thread execution. Thus, upon receiving an exceptional flow control request 49, the exception monitor 102 sets the watchpoints and, once detected by the set watchpoints, control is redirected to the exception handlers 105 to stop thread execution. The thread that requested exceptional flow control waits for the watched execution threads to stop at a rendezvous point. Upon completion of the rendezvous, the watchpoints are cleared and normal execution by the watched execution threads resumes.

Other implementations of watchpoint facilities are possible. For example, in a further embodiment, a signal handler implemented by the operating system or a watchpoint library sends a signal to the watched process when a watchpoint is hit, in a manner similar to having a shared exception handler for all watchpoints. The watched process then discovers the watchpoint that was triggered by examining the program counter or other information in the context information supplied to the signal handler.

Memory Mapping with Watchpoints Set

Figure 8:
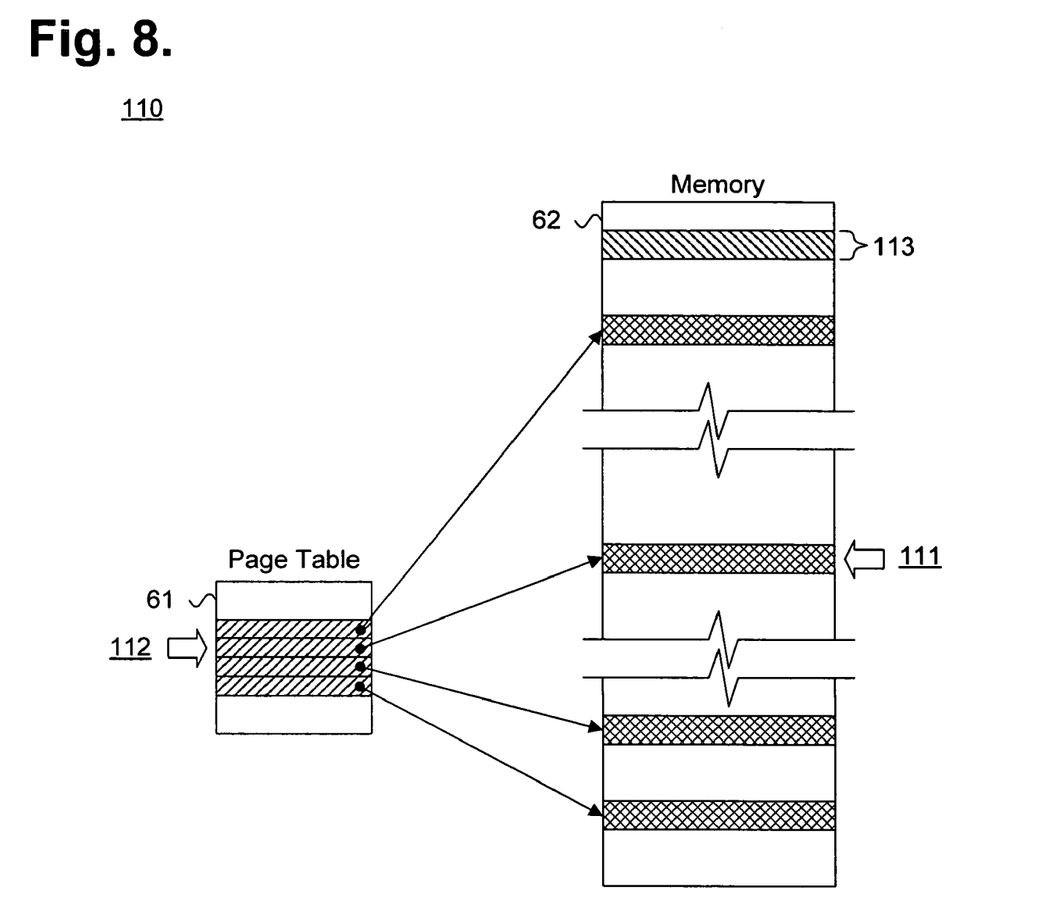
FIG. 8 is a block diagram showing, by way of example, a process mapped into memory with watchpoints set.

FIG. 8 is a block diagram 110 showing, by way of example, a process mapped into memory with watchpoints set. A watchpoint 111 is set to cover a region of memory 62 at an execution point identified in the execution point table 47. The watchpoint 111 is set upon detecting an exceptional flow control request 49 and, when the watchpoint 111 is detected, an exception handler 113 is executed to stop thread execution at the rendezvous. In a further embodiment, a page 112 in the page table 61 staging generated code containing an execution point identified in the execution point table 47 is detected and the exception handler 113 is executed to stop thread execution at the rendezvous.

Method for Providing Exceptional Flow Control Through Watchpoints

Figure 9:
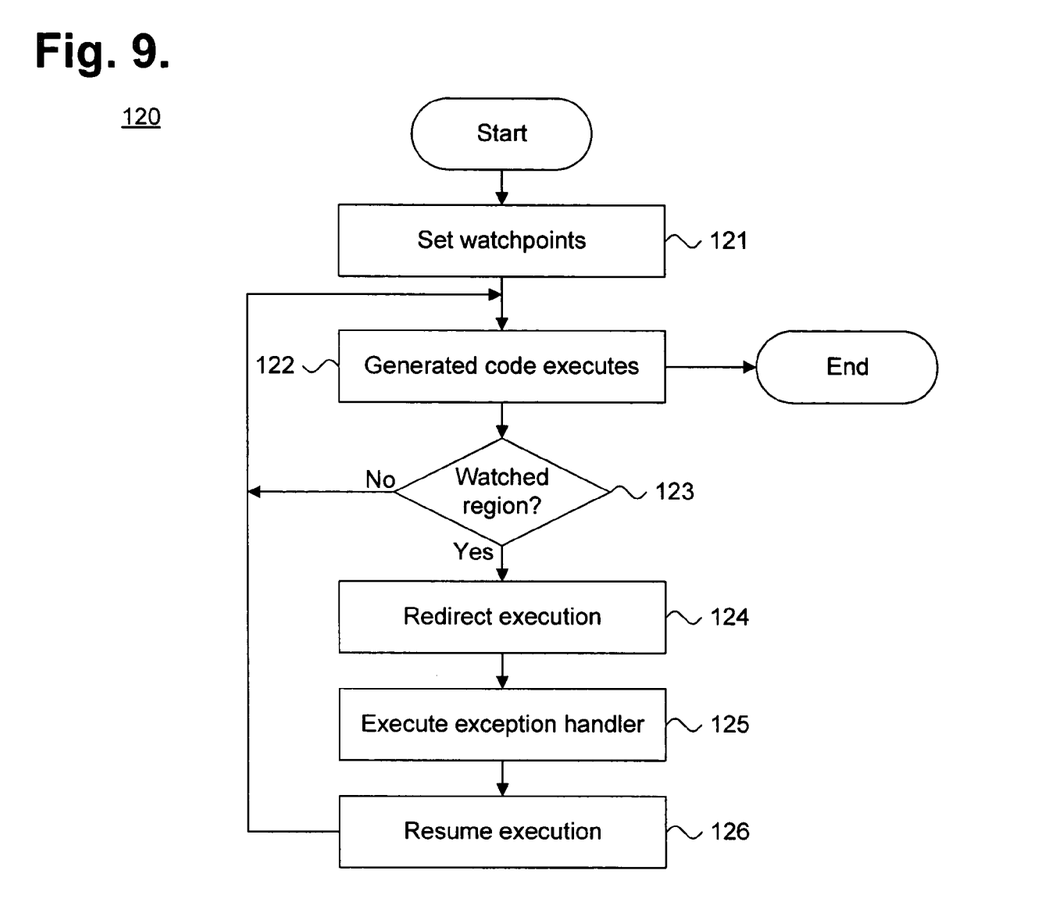
FIG. 9 is a flow diagram showing a method for providing exceptional flow control in protected code through watchpoints, in accordance with one embodiment.

FIG. 9 is a flow diagram showing a method 120 for providing exceptional flow control in protected code through watchpoints, in accordance with one embodiment. The method 100 is described as a sequence of process operations or steps, which can be executed, for instance, by the runtime environment 101 of FIG. 7 or other components.

Initially, one or more watchpoints 111 are set (block 121) in response to an exceptional flow control request 49. The generated code 46 executes (block 122) and, upon execution into a watch region (block 123), execution is redirected (block 124) to trigger the execution of an exception handler 113 (block 125), after which the watchpoint is cleared and execution of the generated code 46 resumes (block 126).

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing exceptional flow control in protected code through watchpoints, comprising:
    a processor;
    an execution mechanism on the processor, wherein the execution mechanism is configured to progressively execute portions of generated code at runtime, wherein the generated code is one of: non-modifiable read-only code that cannot be patched, code embodied on read-only memory, or code being used by a child process in a system that uses copy-on-write semantics;
    at runtime, the execution mechanism is further configured to:
        receive an exceptional flow control request;
        set at least one watchpoint corresponding to at least one execution point in response to the exceptional flow control request, wherein the execution mechanism is configured to set a watchpoint corresponding to each listed execution point in a list of execution points in response to an exceptional flow control request;
        monitor the execution of the portions of generated code to determine if execution is about to commence for a portion of the generated code that is associated with a set watchpoint; and
        upon determining that execution of a portion of the generated code that is associated with a set watchpoint is about to commence, halt the execution of the portion of the generated code and execute an exception handler for the watchpoint to perform one or more operations exceptional to the execution of the portions of the generated code, wherein performing at least one of the operations exceptional to the execution of the portions of the generated code involves performing a garbage collection.

2. The system of claim 1, wherein the exceptional flow control request comprises a global garbage collection request.

3. The system of claim 1, wherein the execution mechanism is configured to provide a runtime environment to execute the exception handler, to disable the watchpoint, and to resume the progressive execution of the portions of the generated code upon disablement of the watchpoint.

4. The system of claim 1, wherein each execution point comprises at least one of a breakpoint, rendezvous, instrumentation point, profiling point, and garbage collection point.

5. A method for providing exceptional flow control in protected code through watchpoints, comprising:
   progressively executing portions of generated code at runtime, wherein the generated code is one of: non-modifiable read-only code that cannot be patched, code embodied on read-only memory, or code being used by a child process in a system that uses copy-on-write semantics;
   receiving an exceptional flow control request at runtime;
   setting at least one watchpoint corresponding to at least one execution point in response to the exceptional flow control request, wherein setting the at least one watchpoint involves setting a watchpoint at each execution point in a list of execution points in response to an exceptional flow control request;
   monitoring the execution of the portions of generated code to determine if execution is about to commence for a portion of the generated code that is associated with a set watchpoint; and
   upon determining that execution of a portion of the generated code that is associated with a set watchpoint is about to commence, halting the execution of the portion of the generated code and executing an exception handler for the watchpoint to perform one or more operations exceptional to the execution of the portions of the generated code, wherein performing at least one of the operations exceptional to the execution of the portions of the generated code involves performing a garbage collection.

6. The method of claim 5, wherein the exceptional flow control request comprises a global garbage collection request.

7. The method of claim 5, further comprising:
   executing the exception handler;
   disabling the watchpoint; and
   resuming the progressive execution of the portions generated code upon disablement of the watchpoint.

8. The method of claim 5, wherein each execution point comprises at least one of a breakpoint, rendezvous, instrumentation point, profiling point, and garbage collection point.

9. A computer-readable storage medium storing code that when executed by a computer causes the computer to perform a method for providing exceptional flow control in protected code through watchpoints, the method comprising:
   progressively executing portions of generated code at runtime, wherein the generated code is one of: non-modifiable read-only code that cannot be patched, code embodied on read-only memory, or code being used by a child process in a system that uses copy-on-write semantics;
   receiving an exceptional flow control request at runtime;
   setting at least one watchpoint corresponding to at least one execution point in response to the exceptional flow control request, wherein setting the at least one watchpoint involves setting a watchpoint at each execution point in a list of execution points in response to an exceptional flow control request;
   monitoring the execution of the portions of generated code to determine if execution is about to commence for a portion of the generated code that is associated with a set watchpoint; and
   upon determining that execution of a portion of the generated code that is associated with a set watchpoint is about to commence, halting the execution of the portion of the generated code and executing an exception handler for the watchpoint to perform one or more operations exceptional to the execution of the portions of the generated code, wherein performing at least one of the operations exceptional to the execution of the portions of the generated code involves performing a garbage collection.

* * * * *

UNITED STATES PATENT AND TRADEMARK OFFICE
CERTIFICATE OF CORRECTION

| | | |
|---|---|---|
| PATENT NO. | : 7,647,586 B2 | |
| APPLICATION NO. | : 10/918131 | |
| DATED | : January 12, 2010 | |
| INVENTOR(S) | : Long et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 654 days.

Signed and Sealed this

Sixteenth Day of November, 2010

David J. Kappos
*Director of the United States Patent and Trademark Office*